(12) United States Patent
Wang et al.

(10) Patent No.: US 7,828,259 B2
(45) Date of Patent: Nov. 9, 2010

(54) ELECTRONIC DEVICE HOLDER

(75) Inventors: Chen-Hsing Wang, Taipei (TW);
Chia-Lin Lee, Taipei (TW)

(73) Assignee: Lite-On Technology Corp., Taipei (TW)

( * ) Notice: Subject to any disclaimer, the term of this patent is extended or adjusted under 35 U.S.C. 154(b) by 477 days.

(21) Appl. No.: 11/898,808

(22) Filed: Sep. 17, 2007

(65) Prior Publication Data
US 2008/0169393 A1 Jul. 17, 2008

(30) Foreign Application Priority Data
Jan. 15, 2007 (TW) ............................. 96200741 U (51) Int. Cl.
*A47G 1/10* (2006.01)
(52) U.S. Cl. ..................... 248/316.4; 439/164; 379/454
(58) Field of Classification Search ................ 439/164; 379/454; 248/316.4
See application file for complete search history.

(56) References Cited

U.S. PATENT DOCUMENTS

| | | | | |
|---|---|---|---|---|
| 5,187,744 A * | 2/1993 | Richter | ....................... | 379/449 |
| 5,392,350 A * | 2/1995 | Swanson | ..................... | 379/446 |
| 5,409,386 A * | 4/1995 | Banakis et al. | ................ | 439/83 |
| 5,457,745 A * | 10/1995 | Wang | ......................... | 379/454 |
| 6,478,276 B1 * | 11/2002 | Louh | ....................... | 248/309.1 |
| 6,669,155 B2 * | 12/2003 | Ron | ........................ | 248/276.1 |
| 6,902,411 B2 * | 6/2005 | Kubo | ........................... | 439/74 |
| 6,966,533 B1 * | 11/2005 | Kalis et al. | .............. | 248/316.4 |
| 7,403,613 B2 * | 7/2008 | Liou | .......................... | 379/455 |
| 7,413,444 B2 * | 8/2008 | Wang | .......................... | 439/74 |
| 7,497,697 B2 * | 3/2009 | Hoshino et al. | ............... | 439/74 |

* cited by examiner

*Primary Examiner*—Truc T Nguyen
(74) *Attorney, Agent, or Firm*—Rosenberg, Klein & Lee (57) ABSTRACT

An electronic device holder includes: a base; a pivot seat extending uprightly from the base; first and second pivot joints; a connector having front and rear end portions, the rear end portion of the connector being pivoted to the pivot seat through the first pivot joint so as to permit rotation of the connector relative to the pivot seat about a first axis; and a device holding seat having front and rear sides. The rear side of the device holding seat is pivoted to the front end portion of the connector through the second pivot joint so as to permit rotation of the device holding seat relative to the connector about a second axis.

12 Claims, 7 Drawing Sheets

ELECTRONIC DEVICE HOLDER

CROSS-REFERENCE TO RELATED APPLICATION

This application claims priority of Taiwanese Application No. 096200741, filed on Jan. 15, 2007.

BACKGROUND OF THE INVENTION

1. Field of the Invention

The invention relates to an electronic device holder, more particularly to an electronic device holder including a device holding seat that is rotatable about first and second axes.

2. Description of the Related Art

Figure 1:
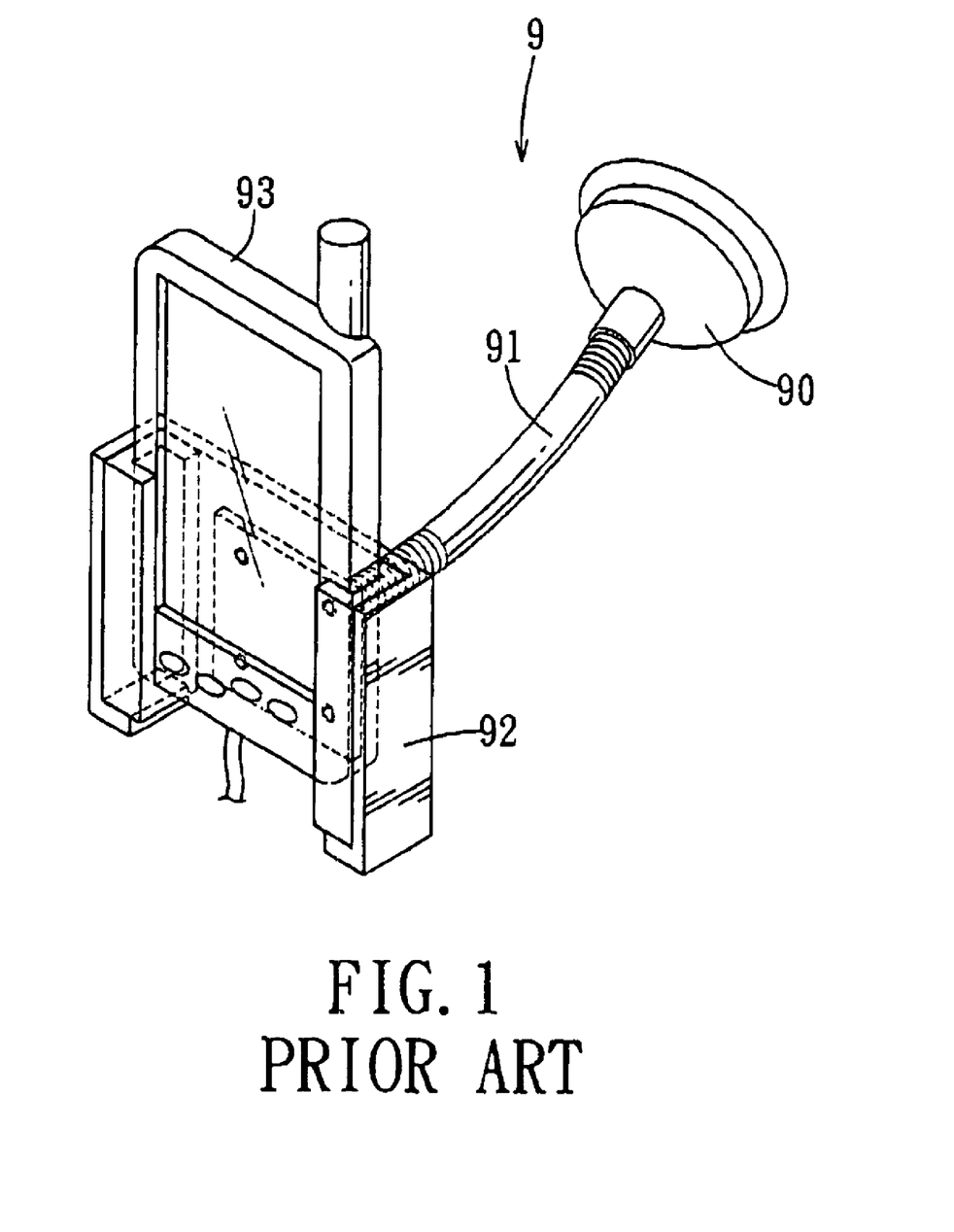
FIG. 1 is a perspective view of a conventional electronic device holder.

Referring to FIG. 1, a conventional electronic device holder 9 is adapted to be mounted on an interior of a vehicle for holding an electronic device 93, such as a mobile phone, a PDA (personal digital assistant), a GPS (global positioning system) device, etc. The electronic device holder 9 includes a sucking member 90, a supporting arm 91 and a device holding seat 92. The sucking member 90 is connected to a rear end of the supporting arm 91 for attaching to the interior of the vehicle, such as car windshield. The device holding seat 92 is connected to a front end of the supporting arm 91 for holding the electronic device 93. The supporting arm 91 is in the form of a bellows tube.

The aforesaid conventional electronic device holder 9 is disadvantageous in that movement of the device holding seat 92 to a desired position through the supporting arm 91 is difficult to achieve and normally requires several moving operations. In addition, the wire of the electronic device 93 tends to undesirably entangle in the electronic device holder 9 when charging in the vehicle and adjusting the position of the electronic device 93 simultaneously.

SUMMARY OF THE INVENTION

Therefore, the object of the present invention is to provide an electronic device holder that can overcome the aforesaid drawbacks associated with the prior art.

Accordingly, an electronic device holder of the present invention comprises: a base; a pivot seat extending uprightly from the base; first and second pivot joints; a connector having front and rear end portions, the rear end portion of the connector being pivoted to the pivot seat through the first pivot joint so as to permit rotation of the connector relative to the pivot seat about a first axis; and a device holding seat having front and rear sides. The front side of the device holding seat is formed with a front recess that opens frontwardly and that is adapted to accommodate an electronic device therein. The rear side of the device holding seat is pivoted to the front end portion of the connector through the second pivot joint so as to permit co-rotation of the device holding seat and the connector relative to the pivot seat about the first axis and so as to permit rotation of the device holding seat relative to the connector about a second axis perpendicular to the first axis.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
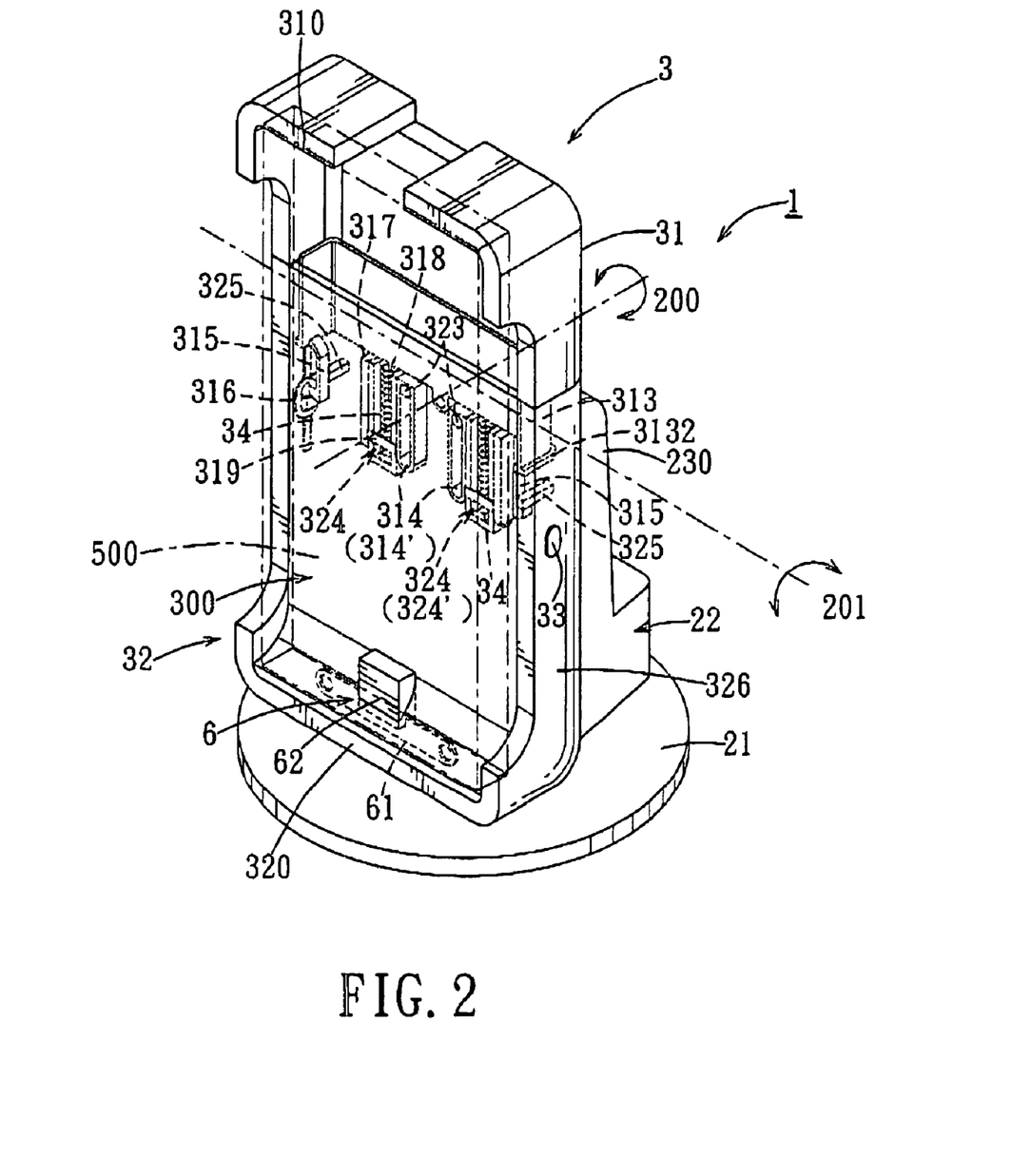
FIG. 2 is an assembled perspective view of the preferred embodiment of an electronic device holder according to the present invention, illustrating a state where first and second parts of a device holding seat are disposed at a first position.
Figure 3:
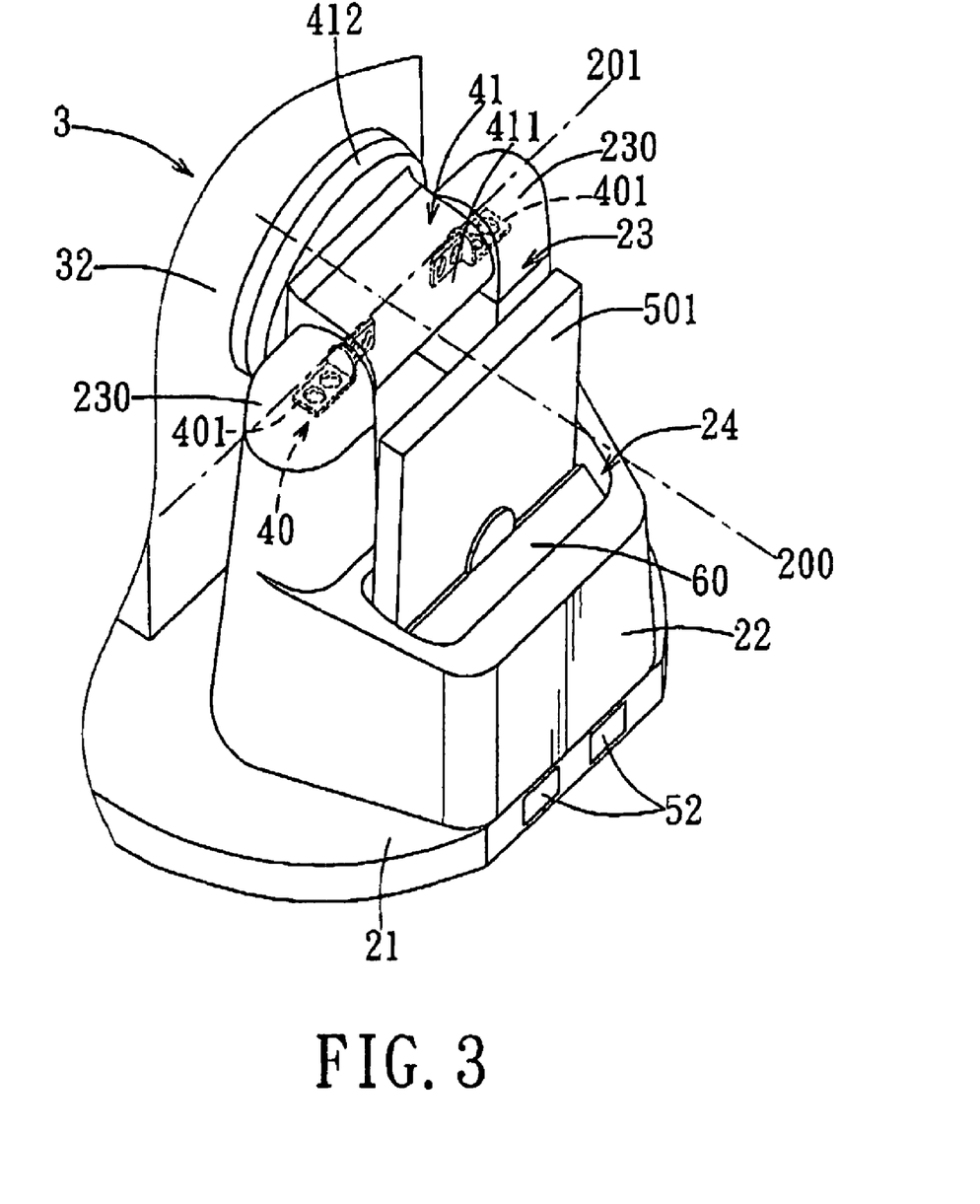
FIG. 3 is a fragmentary perspective view of the preferred embodiment.
Figure 6:
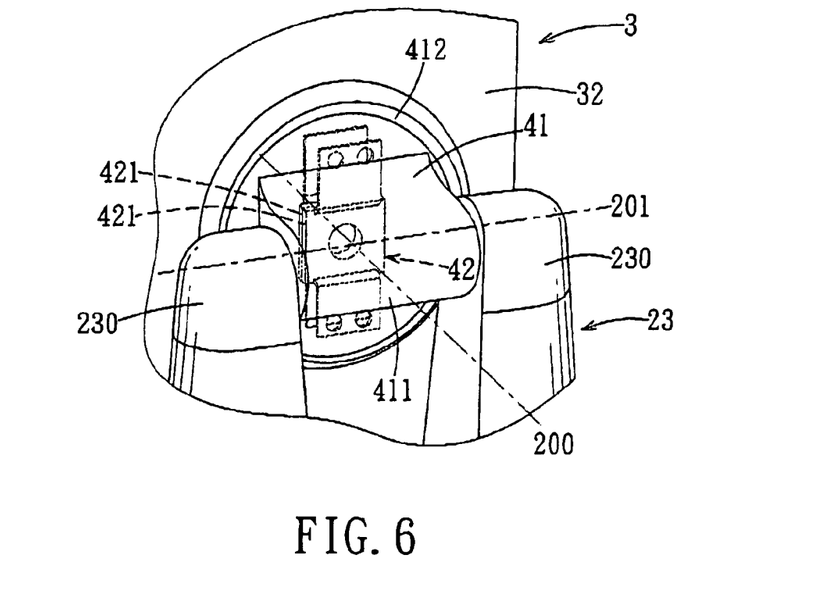
FIG. 6 is a fragmentary perspective view illustrating how the device holding seat of the preferred embodiment is pivoted to a connector.
Figure 8:
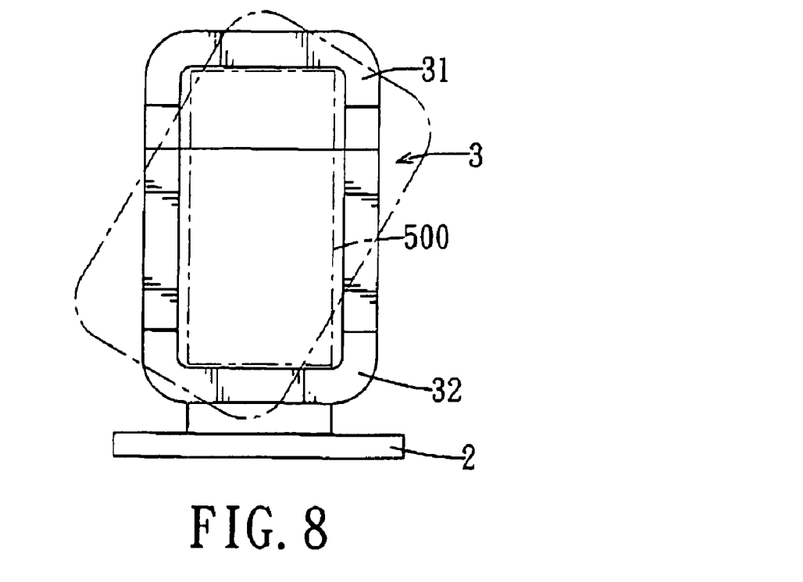
FIG. 8 is a schematic front view of the preferred embodiment to illustrate a state where the device holding seat rotates about an axis.
Figure 9:
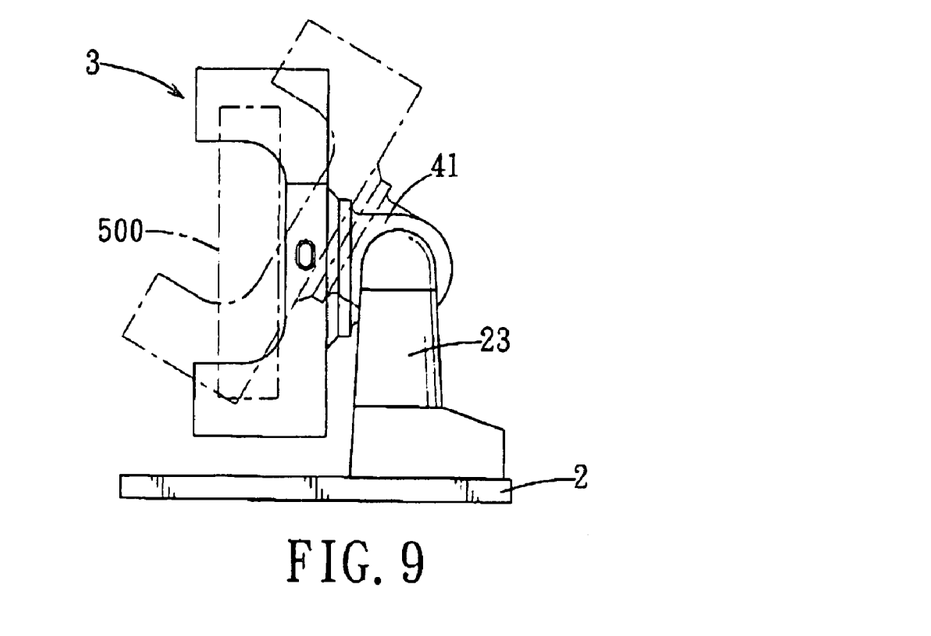
FIG. 9 is a schematic side view of the preferred embodiment to illustrate another state where the device holding seat rotates about another axis.

Referring to FIGS. 2, 3 and 6, the preferred embodiment of an electronic device holder 1 according to the present invention is shown to be adapted to be mounted on a supporting surface, such as an interior of a vehicle (not shown), for holding an electronic device 500, such as a mobile phone, a PDA (personal digital assistant), a GPS (global positioning system) device, etc., and includes: a base 21 adapted to be mounted on the supporting surface; a pivot seat 23 extending uprightly from the base 21; first and second pivot joints 40, 42 (see FIGS. 3 and 6); a connector 41 having front and rear end portions 412, 411, the rear end portion 411 of the connector 41 being pivoted to the pivot seat 23 through the first pivot joint 40 so as to permit rotation of the connector 41 relative to the pivot seat 23 about a first axis 201; and a device holding seat 3 having front and rear sides. The front side of the device holding seat 3 is formed with a front recess 300 that opens frontwardly and that is adapted to accommodate the electronic device 500 therein. The rear side of the device holding seat 3 is pivoted to the front end portion 412 of the connector 41 through the second pivot joint 42 so as to permit co-rotation of the device holding seat 3 and the connector 41 relative to the pivot seat 23 about the first axis 201, as best shown in FIG. 9, and so as to permit rotation of the device holding seat 3 relative to the connector 41 about a second axis 200 perpendicular to the first axis 201, as best shown in FIG. 8. In this embodiment, the electronic device 500 is a GPS device. However, in practice, it may be other types of electronic devices, such as a FDA.

Figure 4:
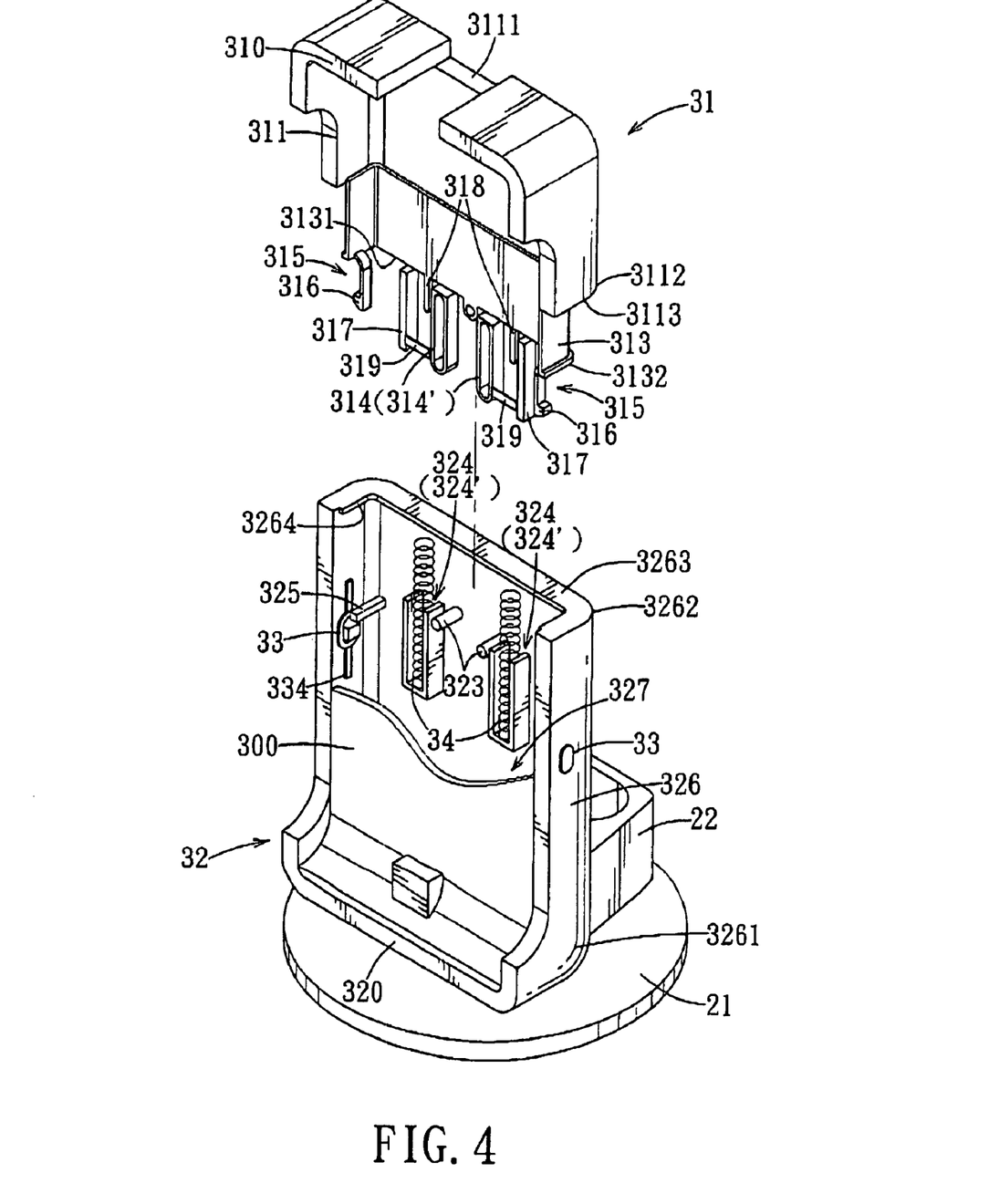
FIG. 4 is an exploded perspective view of the preferred embodiment.
Figure 5:
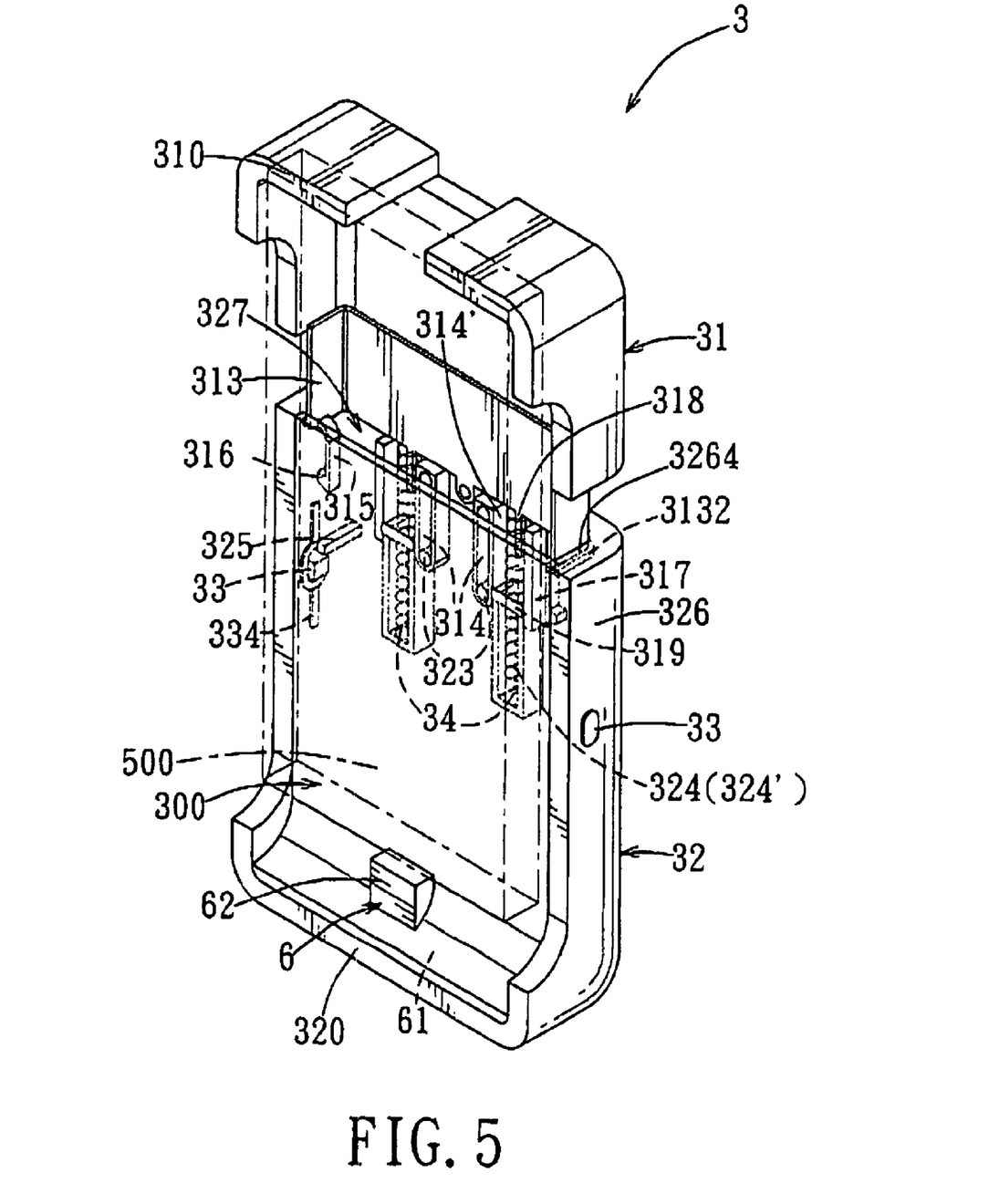
FIG. 5 is a perspective view of the preferred embodiment, illustrating another state where the first and second parts of the device holding seat are disposed at a second position.

Referring now to FIG. 4, in combination with FIGS. 2 and 5, the device holding seat 3 includes first and second parts 31, 32 that are movable relative to each other so as to permit adjustment in the length of the front recess 300. The first and second parts 31, 32 of the device holding seat 3 have first and second brims 310, 320 protruding frontwardly and respectively therefrom and confining respectively two ends of the front recess 300. The first and second parts 31, 32 are movable relative to each other along the length of the front recess 300 between first and second positions (see FIGS. 2 and 5) sc as to adjust the distance between the first and second brims 310, 320. In operation, the first and second brims 310, 320 are adapted to abut respectively against two opposite ends of the electronic device 500 when the first and second parts 31, 32 are disposed at the first position (see FIG. 2), thereby holding firmly the electronic device 500 in the front recess 300. The first brim 310 is spaced apart from an adjacent one of the ends of the electronic device 500 when the first and second parts 31, 32 are disposed at the second position (see FIG. 5), thereby facilitating removal or insertion of the electronic device 500 from or into the front recess 300.

In this embodiment, the first part 31 of the device holding seat 3 is formed with a pair of elongate rails 314' (see FIG. 4), each of which defines a guiding slot 314, and the second part 32 of the device holding seat 3 is formed with a pair of guiding studs 323, each of which extends into the guiding slot 314 of a respective one of the elongate rails 314' so as to permit sliding movement of the first part 31 on the second part 32 along the length of the front recess 300. The first part 31 of the device holding seat 3 is further formed with a pair of first interlocking protrusions 315, and the second part 32 is further formed with a pair of second interlocking protrusions 325, each of which engages a respective one of the first interlocking protrusions 315 when the first and second parts 31, 32 are disposed at the first position (see FIG. 2), thereby retaining the first and second parts 31, 32 at the first position. Each of the first interlocking protrusions 315 has a hook free end 316 that engages the respective one of the second interlocking protrusions 325 when the first and second parts 31, 32 are disposed at the first position. The second part 32 is provided with a pair of pressable buttons 33, each of which is disposed adjacent to a respective one of the second interlocking protrusions 325 and each of which is operable to move toward and to disengage the hook free end 316 of a respective one of the first interlocking protrusions 315 from the respective one of the second interlocking protrusions 325, thereby permitting sliding movement of the first and second parts 31, 32 from the first position to the second position.

The second part 32 of the device holding seat 3 is further formed with a pair of U-shaped retaining members 324' defining respectively two spring-retaining grooves 324 for extension of a pair of elastic members 34 therein. The elastic members 34 abut against the first part 31 so as to restore the first and second parts 31, 32 from the first position to the second position when the first interlocking protrusions 315 are disengaged from the second interlocking protrusions 325. In this embodiment, each of the elastic members 34 is in the form of a compression spring.

The second part 32 of the device holding seat 3 further has a surrounding wall 326 that defines an inner space 327 therein and that has a closed end 3261 (see FIG. 4) and an open end 3262 opposite to the closed end 3261. The second brim 320 extends frontwardly and transversely from the closed end 3261 of the surrounding wall 326. The first part 31 further has a U-shaped counter wall 311 that has opposite first and second ends 3111, 3112. The first brim 310 extends frontwardly and transversely from the first end 3111 of the U-shaped counter wall 311. The first part 31 further has a U-shaped inserting plate 313 that is disposed opposite to the first brim 310, that extends from the second end 3112 of the U-shaped is counter wall 311 into the inner space 327 of the surrounding wall 326, and that has a free end 3131 abutting against top ends of the elastic members 34. The elongate rails 314' extend from the free end 3131 of the U-shaped inserting plate 313. The second end 3112 of the U-shaped counter wall 311 has a U-shaped end face 3113. The open end 3262 of the surrounding wall 326 has an end face with a U-shaped portion 3263 that conforms to the U-shaped end face 3113 of the U-shaped counter wall 311.

In order to retain the elastic members 34 firmly in the spring-retaining grooves 324, the first part 31 is further formed with a pair of confining bars 317 extending downwardly from the free end 3131 of the U-shaped inserting plate 313, and a pair of confining rods 318 extending downwardly from the free end 3131 of the U-shaped inserting plate 313. Each of the confining bars 317 cooperates with a respective one of the elongate rails 314' to define a receiving space therebetween. Each of the U-shaped retaining members 324' and each of the elastic members 34 extend into the receiving space between a respective one of the confining bars 317 and a respective one of the elongate rails 314'. Each of the confining rods 318 extends into an inner space in a respective one of the elastic members 34 within the receiving space between a respective one of the confining bars 317 and a respective one of the elongate rails 314'. The first part 31 is further formed with a pair of crossbars 319, each of which interconnects a respective one of the confining bars 317 and a respective one of the elongate rails 314' so as to prevent undesired removal of a respective one of the elastic members 34 from a front opening of the respective spring-retaining groove 324.

In order to prevent undesired removal of the first part 31 from the second part 32, the free end 3131 of the U-shaped inserting plate 313 is formed with an outer flange 3132 projecting rearwardly therefrom, and the open end 3262 of the surrounding wall 326 is formed with an inner flange 3264 projecting frontwardly therefrom and engaging the outer flange 3132 of the free end 3131 of the U-shaped inserting plate 313 when the first and second parts 31, 32 are moved relative to each other to the second position (see FIG. 5).

Figure 7:
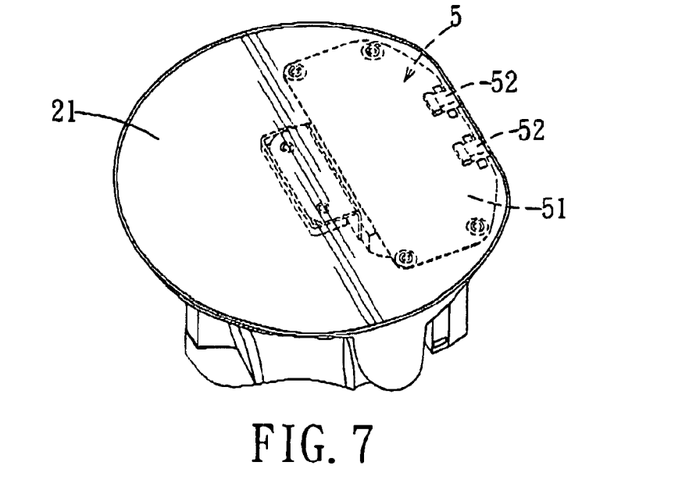
FIG. 7 is a fragmentary perspective view illustrating the configuration of a charging unit of the preferred embodiment.

Referring now to FIG. 7, in combination with FIG. 3, a first charging unit 5 is provided on the base 21. A charge seat 22 extends from the pivot seat 23, is seated on the base 21, and is formed with a retaining slot 24 in spatial communication with the first charging unit 5 and adapted for insertion of a rechargeable battery 501 therein for electrical connection between the rechargeable battery 501 and the first charging unit 5. The first charging unit 5 includes a circuit board 51 mounted on the base 21, and a pair of connectors 52 connected electrically to the circuit board 51, and adapted to be connected electrically to the electronic device 500 through an electric wire (not shown). Optionally, a cushioning pad 60 can be provided in the retaining slot 24 for retaining firmly the rechargeable battery 501 in the retaining slot 24. A second charging unit 6 (see FIG. 2) includes a connecting circuit 61 provided on the second part 32 of the device holding seat 3 and connected electrically to the first charging unit 5, and a bridging member 62 protruding from the second part 32 into the front recess 300, connected electrically to the connecting circuit 61, and adapted to be connected electrically to the electronic device 500 so as to permit recharging of the electronic device 500.

Referring again to FIGS. 3 and 6, in this embodiment, the pivot seat 3 includes a pair of pivot arms 230, and the first pivot joint 40 includes a pair of hinges 401, each of which interconnects a respective one of the pivot arms 230 of the pivot seat 23 and the rear end 411 of the connector 41. The second pivot joint 42 includes a pair of pivot plates 421 that are pivoted to each other in a tongue and groove engaging manner.

Each of the pressable buttons 33 extends through the surrounding wall 326 of the second part 32 of the device holding seat 3. A pair of resilient connecting members 334 are provided on an interior of the surrounding wall 326 of the second part 32. Each of the resilient connecting members 334 is connected to a respective one of the pressable buttons 33 so as to restore the respective pressable button 33 from a pressed position to a non-pressed position.

In operation, referring to FIGS. 2 and 5, the first and second parts 31, 32 are first moved to the second position (see FIG. 5) so that the electronic device 500 can be easily placed in the front recess 300. The first and second parts 31, 32 are then moved from the second position to the first position (see FIG. 2) against the urging action of the elastic members 34, in which the elastic members 34 are compressed to accumulate a restoring force, in which the first and second interlocking protrusions 315, 325 are brought into engagement with each other, and in which the first brim 310 of the first part 31 is brought into abutment against the electronic device 500. The device holding seat 3 can then be rotated about the first axis 201 and/or the second axis 200 to place the electronic device 500 at a desired position.

When the electronic device 500 is to be removed from the front recess 300, the pressable buttons 33 are pressed so as to disengage the first interlocking protrusions 315 from the second interlocking protrusions 325. Then, by virtue of the restoring force of the elastic members 34, the first and second parts 31, 32 are moved to the second position to allow easy removal of the electronic device 500 from the front recess 300.

With the inclusion of the first and second pivot joints 40, 42 and the connectors 52 in the electronic device holder of this invention, the aforesaid drawbacks with respect to the difficulty in positioning the electronic device and the wire entangling problem during movement of the supporting arm in the prior art can be eliminated.

While the present invention has been described in connection with what is considered the most practical and preferred embodiment, it is understood that this invention is not limited to the disclosed embodiment but is intended to cover various arrangement included within the spirit and scope of the broadest interpretation so as to encompass all such modifications and equivalent arrangements.

What is claimed is:

1. An electronic device holder comprising:
   a base;
   a pivot seat extending uprightly from said base;
   first and second pivot joints;
   a connector having front and rear end portions, said rear end portion of said connector being pivoted to said pivot seat through said first pivot joint so as to permit rotation of said connector relative to said pivot seat about a first axis; and
   a device holding seat having front and rear sides, said front side of said device holding seat being formed with a front recess that opens frontwardly and that is adapted to accommodate an electronic device therein, said rear side of said device holding seat being pivoted to said front end portion of said connector through said second pivot joint so as to permit co-rotation of said device holding seat and said connector relative to said pivot seat about said first axis and so as to permit rotation of said device holding seat relative to said connector about a second axis perpendicular to said first axis said device holding seat including first and second parts that are movable relative to each other for adjustment in a length of said front recess, said first and second parts of said device holding seat having first and second brims protruding frontwardly and respectively therefrom and confining respectively two ends of said front recess, said first and second parts being movable relative to each other along the length of said front recess between first and second positions for adjusting a distance between said first and second brims, said first and second brims being adapted to abut respectively against two opposite ends of the electronic device when said first and second parts are disposed at the first position, said first brim being adapted to be spaced apart from an adjacent one of the ends of the electronic device when said first and second parts are disposed at the second position.

2. The electronic device holder as claimed in claim 1, wherein said first part of said device holding seat is formed with a pair of elongate rails, each of which defines a guiding slot, said second part of said device holding seas being formed with a pair of guiding studs, each of which extends into said guiding slot of a respective one of said elongate rails so as to permit sliding movement of said first part on said second part along the length of said front recess.

3. The electronic device holder as claimed in claim 2, wherein said first part of said device holding seat is further formed with a pair of first interlocking protrusions, said second part being further formed with a pair of second interlocking protrusions, each of which engages a respective one of said first interlocking protrusions when said first and second parts are disposed at the first position, thereby retaining said first and second parts at the first position.

4. The electronic device holder as claimed in claim 3, wherein each of said first interlocking protrusions has a hook free end that engages the respective one of said second interlocking protrusions when said first and second parts are disposed at the first position, said second part being provided with a pair of pressable buttons, each of which is disposed adjacent to a respective one of said second interlocking protrusions and each of which is operable to move toward and to disengage said hook free end of a respective one of said first interlocking protrusions from the respective one of said second interlocking protrusions, thereby permitting sliding movement of said first and second parts from the first position to the second position.

5. The electronic device holder as claimed in claim 3, further comprising a pair of elastic members that are mounted on said second part of said device holding seat and that abut against said first part so as to restore said first and second parts from the first position to the second position when said first interlocking protrusions are disengaged from said second interlocking protrusions.

6. The electronic device holder as claimed in claim 2, further comprising a pair of elastic members that are mounted on said second part of said device holding seat and that abut against said first part.

7. The electronic device holder as claimed in claim 6, wherein said second part of said device holding seat further has a surrounding wall that defines an inner space therein, and that has a closed end and an open end opposite to said closed end, said second brim extending frontwardly and transversely from said closed end of said surrounding wall, said first part further having a U-shaped counter wall that has opposite first and second ends, said first brim extending frontwardly and transversely from said first end of said U-shaped counter wall, said first part further having a U-shaped inserting plate that is disposed opposite to said first brim, that extends from said second end of said U-shaped counter wall into said inner space of said surrounding wall, and that has a free end, said elongate rails extending from said free end of said U-shaped inserting plate, said second end of said U-shaped counter wall having a U-shaped end face, said open end of said surrounding wall having an end face with a U-shaped portion that conforms to said U-shaped end face of said U-shaped counter wall.

8. The electronic device holder as claimed in claim 7, wherein said first part is formed with a pair of confining bars extending downwardly from said free end of said U-shaped inserting plate, and a pair of confining rods extending downwardly from said free end of said U-shaped inserting plate, each of said confining bars cooperating with a respective one of said elongate rails to define a receiving space therebetween, said second part being formed with a pair of U-shaped retaining members defining respectively two spring-retaining grooves, each of said elastic members extending into a respective one of said spring-retaining grooves, each of said U-shaped retaining members and each of said elastic members extending into said receiving space between a respective one of said confining bars and a respective one of said elongate rails, each of said confining rods extending into a respective one of said elastic members within said receiving space between a respective one of said confining bars and a respective one of said elongate rails.

9. The electronic device holder as claimed in claim 8, wherein said first part is further formed with a pair of crossbars, each of which interconnects a respective one of said confining bars and a respective one of said elongate rails.

10. The electronic device holder as claimed in claim 9, wherein said free end of said U-shaped inserting plate is formed with an outer flange projecting rearwardly therefrom, said open end of said surrounding wall being formed with an inner flange projecting frontwardly therefrom and engaging said outer flange of said free end of said U-shaped inserting plate when said first and second parts are moved relative to each other to said second position.

11. An electronic device holder comprising:

a base;

a pivot seat extending uprightly from said base;

first and second pivot joints;

a connector having front and rear end portions, said rear end portion of said connector being pivoted to said pivot seat through said first pivot joint so as to permit rotation of said connector relative to said pivot seat about a first axis;

a device holding seat having front and rear sides, said front side of said device holding seat being formed with a front recess that opens frontwardly and that is adapted to accommodate an electronic device therein, said rear side of said device holding seat being pivoted to said front end portion of said connector through said second pivot joint so as to permit co-rotation of said device holding seat and said connector relative to said pivot seat about said first axis and so as to permit rotation of said device holding seat relative to said connector about a second axis perpendicular to said first axis, said device holding seat including first and second parts that are movable relative to each other for adjustment in a length of said front recess;

a charging unit provided on said base; and a charge seat extending from said pivot seat and disposed on said base, said charge seat being formed with a retaining slot in spatial communication with said charging unit and adapted for insertion of a rechargeable battery therein for electrical connection between the rechargeable battery and said charging unit.

12. The electronic device holder as claimed in claim 11, further comprising a connecting circuit provided on said second part of said device holding seat and connected electrically to said charging unit, and a bridging member protruding from said second part into said front recess, connected electrically to said connecting circuit, and adapted to be connected electrically to the electronic device so as to permit recharging of the electronic device.

* * * * *